Patented Jan. 5, 1954

2,665,281

UNITED STATES PATENT OFFICE 2,665,281

CHEMICAL COMPOUNDS AND PROCESSES OF PREPARING THE SAME

Martin Seidman, Chicago, Ill., and Karl Paul Link, Middleton, Wis., assignors to Wisconsin Alumni Research Foundation, Madison, Wis., a corporation of Wisconsin No Drawing. Application March 1, 1951, Serial No. 213,485

3 Claims. (Cl. 260—343.2)

The present invention relates to new chemical compounds and processes of preparing the same. More specifically, the present invention is directed to 3,4-substituted coumarins and improved processes of preparing the same. The products of the present invention are of interest in the anticoagulant field generally and the rodenticide field specifically, and may be used as intermediates for the preparation of other products.

Shortly after the anticoagulant 3,3'-methylenebis (4-hydroxycoumarin) was isolated from spoiled sweet clover hay, identified, and synthesized, its marked toxicity in the rat was noted. H. S. Overman, J. B. Field, C. A. Baumann, and K. P. Link, J. Nutrition, 23, 589 (1942); K. P. Link, Harvey Lecture Series, 39, 162 (1943–44). The results of a recent survey in the rodenticide field have shown that 3-($\alpha$-acetonylbenzyl)-4-hydroxycoumarin, known in the art as warfarin, is approximately fifty times more lethal and in addition the time to effect kill is about half that required by 3,3'-methylenebis (4-hydroxycoumarin).

The products of the present invention are cyclic ketals and specially 2-methyl-2-oxy-4-phenyl-5-oxodihydropyrano (3,2-c) (1) benzopyran. The oxy groups at the 2-position are characterized by a hydrocarbon radical with double carbon to carbon bonds, or an oxygen containing hydrocarbon radical containing no double bonds.

The following examples will serve to illustrate the present invention:

EXAMPLE I

*2-methyl-2-benzyloxy-4-phenyl - 5 - oxodihydropyrano (3,2-c) (1) benzopyran.*—A suspension of 10 g. of warfarin in 100 ml. of benzyl alcohol was treated with hydrogen chloride until solution resulted (approximately three minutes). After standing overnight at room temperature the solution was poured into 600 ml. of ice water giving an oil. The water layer was removed by decantation and 100 ml. of methanol was added. The solution was refrigerated for five days and the solid which had formed had a melting point of 148–152° C. After recrystallization from absolute ethanol for analysis the melting point was raised to 162–163° C. The filtrate from the above was returned to the refrigerator and more crystals appeared. These had a melting point of 123–140° C. and were a mixture of diastereomeric racemates.

EXAMPLE II

*2-methyl-2-allyloxy-4-phenyl - 5 - oxodihydropyrano (3,2-c) (1) benzopyran.*—Hydrogen chloride was bubbled into a suspension of 5 g. of warfarin in 50 ml. of allyl alcohol until a clear solution resulted. After standing at room temperature for three hours the mixture was poured into 500 ml. of ice and water with stirring. A gum formed which was dissolved in 30 ml. of boiling methanol. Upon cooling crystals with a melting point of 115–140° C. appeared. Water was then added cautiously to the mother liquor until a faint turbidity was induced. Upon further cooling more product crystallized out. By repeated recrystallization of this more soluble fraction a pure racemate, melting point 121.5–123° C. was obtained.

EXAMPLE III

*2-methyl-2-($\beta$-ethoxyethoxy)-4 - phenyl - 5-oxodihydropyrano (3,2-c) (1) benzopyran.*—Hydrogen chloride was bubbled into a suspension of 10 g. of warfarin in 100 ml. of ethylene glycol monoethylether. Solution resulted after about five minutes. After standing at room temperature for three hours the solution was poured with stirring into 600 ml. of ice and water giving a gum. This gum was dissolved in 100 ml. of hot 95 per cent ethanol. Upon cooling a mixture, melting from 91–112° C. crystallized. The mother liquor upon being diluted with 10 ml. of water was cooled again whereupon a fraction, melting point of 95–98° C. was obtained. This fraction was recrystallized for analysis from 95 per cent ethanol and had a melting point of 102–103° C.

The mother liquor from above was further diluted with water and after refrigeration more material appeared. After recrystallization from 95 per cent ethanol the melting point of this product, an isomer of the above product, was 137–138° C.

EXAMPLE IV

*2-methyl-2-tetrahydrofurfuryloxy-4 - phenyl-5-oxodihydropyrano (3,2-c) (1) benzopyran.*—A mixture of 10 g. of warfarin and 100 ml. of tetrahydrofurfuryl alcohol was treated with hydrogen chloride. Solution occurred rapidly and the solution began to darken. After three minutes the reaction was interrupted by pouring the contents of the flask into 600 ml. of ice and water. The gummy solid which formed was dissolved in hot acetone and upon cooling, crystals with a melting point of 136–137° C. were deposited. Recrystallization from acetone raised the melting point to 139–140° C.

EXAMPLE V

*2-methyl-2-methoxy-4-phenyl-5 - oxodihydropyrano (3,2-c) (1) benzopyran.*—The process of the present invention has also been found to be particularly adaptable for preparing the above product in high yields. It was found, for example, that the presence of excess HCl did not disturb the reaction, i. e., that it was not necessary to employ a standardized 4% methanolic HCl, and that as the reaction mixture gave off heat as the HCl was bubbled in at room temperature that it was also not necessary to reflux with external heat. The following detailed example is illustrative:

Sixty grams of warfarin was suspended in 300 ml. of methanol and hydrogen chloride passed in. The mixture became warm and a clear solution resulted. A mass of crystals then appeared. After cooling the product was filtered off and washed with methanol and dilute sodium hydroxide solution. The mother liquor and the washings were then poured into an excess of water and the solid which precipitated was filtered off. The combined precipitates were recrystallized from benzene, and gave 59 g. of the desired product, melting point 163–164° C. This is a 95% yield which is substantially higher than the previously reported yield of 83% employing the old process.

EXAMPLE VI

*2-methyl-4-phenyl-5-oxo-γ-pyrano (3,2-c) (1) benzopyran*

(a) Two grams of the methoxy product obtained in Example V was suspended in 20 ml. of acetic anhydride and two drops of perchloric acid added. The mixture was heated on a steam bath for one hour giving a green solution. After being cooled the solution was poured into 200 ml. of ice and water to give a pink precipitate. After two recrystallizations from methanol the desired product was obtained, melting point 144–145° C.

(b) Fifteen grams of phenol was melted and 10 g. of warfarin and 4 g. of anhydrous zinc chloride added. The mixture was heated at 70° C. for fifteen minutes. After cooling the melt was poured into 1 liter of ice water and the gum which formed was dissolved in 95% ethanol. Addition of water dropwise caused a precipitate to form. After filtration the crystals were washed with 10% sodium hydroxide solution and recrystallized from ethanol. Three grams of material melting at 127–135° C. was obtained. After two more recrystallizations from methanol the melting point was 145–146° C.

Warfarin possesses an asymmetric carbon atom and the form used in the above reactions was the DL racemate. Since the synthesis of the cyclic ketals results in the formation of a second asymmetric carbon atom two diastereoisomeric racemates should be formed. The products were all obtained in very good yield as mixtures of isomers. Separation of a pure racemate was accomplished by fractional crystallization. Both racemic forms were obtained in Example III.

We claim:

1. The product, 2 - methyl - 2 - (OCH$_2$R″) - 4-phenyl-5-oxodihydropyrano(3,2–c) (1) benzopyran, where R″ is an oxygen containing hydrocarbon radical selected from the group consisting of —CH$_2$OCH$_2$CH$_3$ and

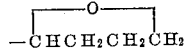

2. The product, 2 - methyl - 2 - tetrahydrofurfuryloxy - 4 - phenyl-5-oxodihydropyrano(3,2–c) (1) benzopyran.

3. The product, 2-methyl-2-(β-ethoxyethoxy)-4-phenyl-5-oxodihydropyrano(3,2–c) (1) benzopyran.

MARTIN SEIDMAN.
KARL PAUL LINK.

References Cited in the file of this patent

UNITED STATES PATENTS

| Number | Name | Date |
|---|---|---|
| 2,427,579 | Stahmann et al. | Sept. 16, 1947 |